(12) United States Patent
Ito (10) Patent No.: US 7,809,677 B2
(45) Date of Patent: Oct. 5, 2010

(54) DATA PROCESSING METHOD, PORTABLE PLAYER AND COMPUTER (75) Inventor: Hiroshi Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 253 days.

(21) Appl. No.: 11/350,822

(22) Filed: Feb. 10, 2006

(65) Prior Publication Data

US 2006/0195205 A1    Aug. 31, 2006

(30) Foreign Application Priority Data

Feb. 21, 2005   (JP) .............................. 2005-043763

(51) Int. Cl.
    G06F 7/00    (2006.01)
(52) U.S. Cl. .................................. 707/604
(58) Field of Classification Search ................. 707/100, 707/102, 602–603
    See application file for complete search history.

(56) References Cited

U.S. PATENT DOCUMENTS

| 5,893,717 | A  | * | 4/1999  | Kirsch et al. ................ 434/118 |
| 6,993,532 | B1 | * | 1/2006  | Platt et al. ................... 707/102 |
| 7,072,846 | B1 | * | 7/2006  | Robinson ..................... 705/10 |
| 2002/0038221 | A1 | * | 3/2002  | Tiwary et al. ................. 705/1 |
| 2002/0161762 | A1 | * | 10/2002 | Morita et al. ................. 707/7 |
| 2002/0161931 | A1 | * | 10/2002 | Morita et al. ............... 709/310 |
| 2003/0021055 | A1 | * | 1/2003  | Tange et al. ................. 360/72.1 |
| 2003/0097334 | A1 | * | 5/2003  | Obata et al. ................... 705/51 |
| 2003/0138240 | A1 | * | 7/2003  | Maeda et al. ............... 386/125 |
| 2003/0166414 | A1 | * | 9/2003  | Sako et al. .................... 463/30 |
| 2003/0182255 | A1 |   | 9/2003  | Plastina et al. |
| 2003/0185110 | A1 | * | 10/2003 | Fujisawa .................. 369/30.05 |
| 2004/0024981 | A1 | * | 2/2004  | Iwatsu et al. ................. 711/165 |
| 2004/0091111 | A1 | * | 5/2004  | Levy et al. .................. 380/202 |
| 2004/0143754 | A1 | * | 7/2004  | Kori et al. .................... 713/200 |
| 2004/0225519 | A1 | * | 11/2004 | Martin ......................... 705/1 |
| 2004/0243540 | A1 | * | 12/2004 | Moskowitz et al. ............ 707/1 |
| 2004/0254851 | A1 | * | 12/2004 | Himeno et al. ............... 705/26 |
| 2005/0020223 | A1 | * | 1/2005  | Ellis et al. ................. 455/186.1 |
| 2005/0021470 | A1 |   | 1/2005  | Martin et al. |
| 2005/0103186 | A1 | * | 5/2005  | Ueoka ......................... 84/601 |
| 2005/0203926 | A1 | * | 9/2005  | Morita et al. ............... 707/100 |

FOREIGN PATENT DOCUMENTS

| JP | 11-27404 | | 1/1999 |
| JP | 11-288420 | | 10/1999 |
| JP | 2000-331025 | | 11/2000 |
| JP | 2002-358726 | | 12/2002 |
| JP | 2003-163847 | | 6/2003 |
| JP | 2003-216636 | | 7/2003 |
| JP | 2004-94320 | | 3/2004 |
| JP | 2004-252882 | | 9/2004 |
| JP | 2005202453 | A * | 7/2005 |
| JP | 2005-243214 | | 9/2005 |

* cited by examiner

Primary Examiner—James Trujillo
Assistant Examiner—Linh Black
(74) Attorney, Agent, or Firm—Oblon, Spivak, McClelland, Maier & Neustadt, L.L.P.

(57) ABSTRACT

To provide services according to preference of a user by a computer even when the user reproduces content data by using a portable player as a reproduction apparatus; the portable player generates a reproduction history data of reproduction of a content data in a state of not connected to a charger, while when the portable player is connected to the charger, the reproduction history data is output from the portable player to the personal computer via the charger.

23 Claims, 11 Drawing Sheets

[ARTISTS UNMATCHED]

PROVIDING INFORMATION ON MUSIC UNMATCHED
WITH ALL TITLES OF SPECIFIC ARTISTS
ON DATABASE FROM PREFERENCE LIST
AND OWNED DISK INFORMATION IN "JUKEBOX"

ALL MUSIC TITLES OF ARTISTS       "JUKEBOX" INFORMATION

SEARCH KEYS:
HIGH-RANKING ARTISTS IN PREFERENCE LIST
OWNED ALBUM NAMES OF THOSE ARTISTS

FIG. 9

【GROUP UNMATCHED】

PROVIDING INFORMATION ON RELATING MUSIC,
SUCH AS SPECIFIC ARTISTSTS' FORMER GROUP,
ON DATABASE FROM PREFERENCE LIST
AND OWNED DISK INFORMATION IN "JUKEBOX"

ALL MUSIC TITLES　　　"JUKEBOX"
RELATED TO ARTISTS　　INFORMATION

SEARCH KEYS:
HIGH-RANKING ARTISTS IN PREFERENCE LIST
OWNED ALBUM NAMES OF THOSE ARTISTS

DATA PROCESSING METHOD, PORTABLE PLAYER AND COMPUTER

CROSS REFERENCES TO RELATED APPLICATIONS

The present invention contains subject matter related to Japanese Patent Application No. 2005-043763 filed in the Japanese Patent Office on Feb. 21, 2005, the entire contents of which being incorporated herein by reference.

BACKGROUND OF THE INVENTION

1. Field of the Invention

The present invention relates to a data processing method, a reproduction apparatus such as a portable player and an information processing apparatus such as a computer for providing services related to content data.

2. Description of the Related Art

For example, there are systems for managing reproduction history of a plurality of music data (audio data) stored in a hard disk of a personal computer and determining preference of the user based on the reproduction history.

In such a system, the user connects a portable player to a personal computer and outputs music data read from a hard disk as the above personal content data to the portable player for storing the same.

Then, the user reproduces the content data stored in the portable player while the user goes outside.

However, in the above system of the related art, since a user often plays back music data by the portable player, preference of the user cannot be specified correctly only by using reproduction history data in the personal computer, so it suffers from the disadvantage that services according to the users' preferences cannot be provided.

SUMMARY OF THE INVENTION

It is desired to provide a data processing method, a portable player and a computer, by which a computer can provide services according to the user's preference even when the user uses a portable player to play content data.

To overcome the above disadvantages of the related art explained above, according to a first invention, there is provided a data processing method including a first step wherein a reproduction apparatus generates and stores a reproduction history data of the reproduction apparatus indicating a reproduction history of a content data in a state where the reproduction apparatus is unconnected to an information processing apparatus; a second step of outputting the reproduction history data stored in the reproduction apparatus in the first step from the reproduction apparatus to the information processing apparatus in a state where the reproduction apparatus is connected to the information processing apparatus; and a third step wherein the information processing apparatus performs processing for outputting a data according to reproduction history of the reproduction apparatus to the reproduction apparatus based on the reproduction history data input from the reproduction apparatus in the second step.

According to a second invention, there is provided a reproduction apparatus, including a reproduction unit for reproducing a content data; an interface for inputting and outputting a data to and from an information processing apparatus; and a control circuit for generating a reproduction history data indicating a reproduction history of the content data by the reproduction unit and making the information processing apparatus output the reproduction history data when the reproduction apparatus is connected to the information processing apparatus via the interface.

An operation of the reproduction apparatus of the second invention is as below.

In a state that the interface is not connected to the information processing apparatus, the control circuit generates the reproduction history data indicating the reproduction history of the content data by a reproduction unit and writes the same to the memory.

Then, when the interface is connected to the information processing apparatus, the control circuit reads the reproduction history data from the memory and outputs the same to the information processing apparatus via the interface.

According to a third invention, there is provided an information processing apparatus including: an interface connected to a reproduction apparatus, for receiving a reproduction history data indicating a reproduction history of a content data in the reproduction apparatus from the reproduction apparatus; and a control circuit for making the reproduction apparatus send data in accordance with the reproduction history via the interface.

An operation of the information processing apparatus of the third invention is as below.

When in the state where the information processing apparatus is connected to a reproduction apparatus, the interface receives the reproduction history data of the content data in the reproduction apparatus generated in a state where the reproduction apparatus is not connected to the interface.

Then, the control circuit performs processing of outputting to the reproduction apparatus a service data according to the reproduction history of the reproduction apparatus based on the reproduction history data input to the interface.

According to the present invention, it is possible to provide a data processing method, a reproduction apparatus and an information processing apparatus, by which the information processing apparatus can provide services according to user's preference even when the user use the reproduction apparatus to reproduce content data.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Below, an audio processing system according to embodiments of the present invention will be explained.

First Embodiment

First, a relationship of components of the present invention and corresponding components of the present embodiment will be explained.

Figure 1:
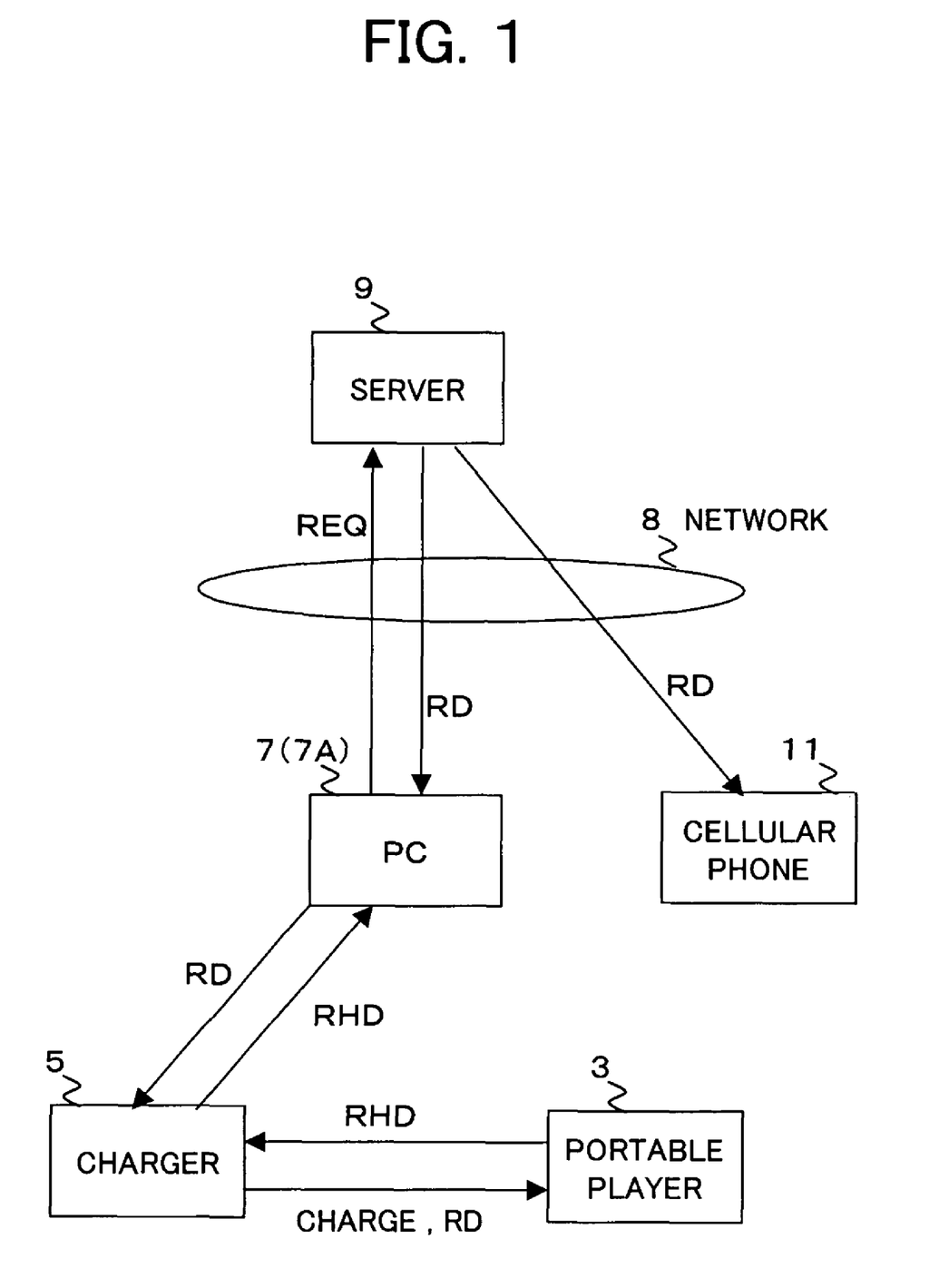
FIG. 1 is an overall view of the configuration of an audio processing system 1 according to a first embodiment of the present invention.

A portable player 3 shown in FIG. 1, etc. corresponds to a reproduction apparatus of the present invention, and a personal computer 7 corresponds to an information processing apparatus of the present invention.

Also, audio music data of the present embodiment corresponds to a content data of the present invention.

Reproduction history data RHD of the present embodiment corresponds to a reproduction history data of the present invention.

Figure 4:
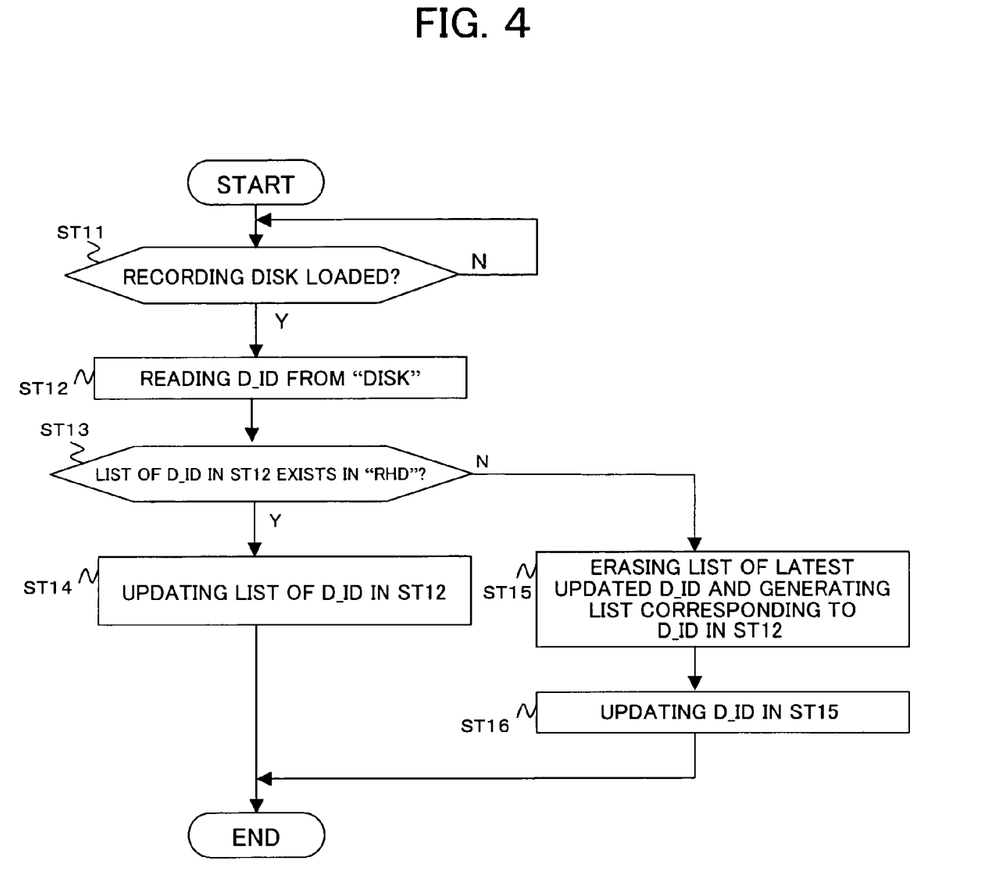
FIG. 4 is a flowchart for explaining processing of generating reproduction history data in the audio processing system shown in FIG. 1.
Figure 6:
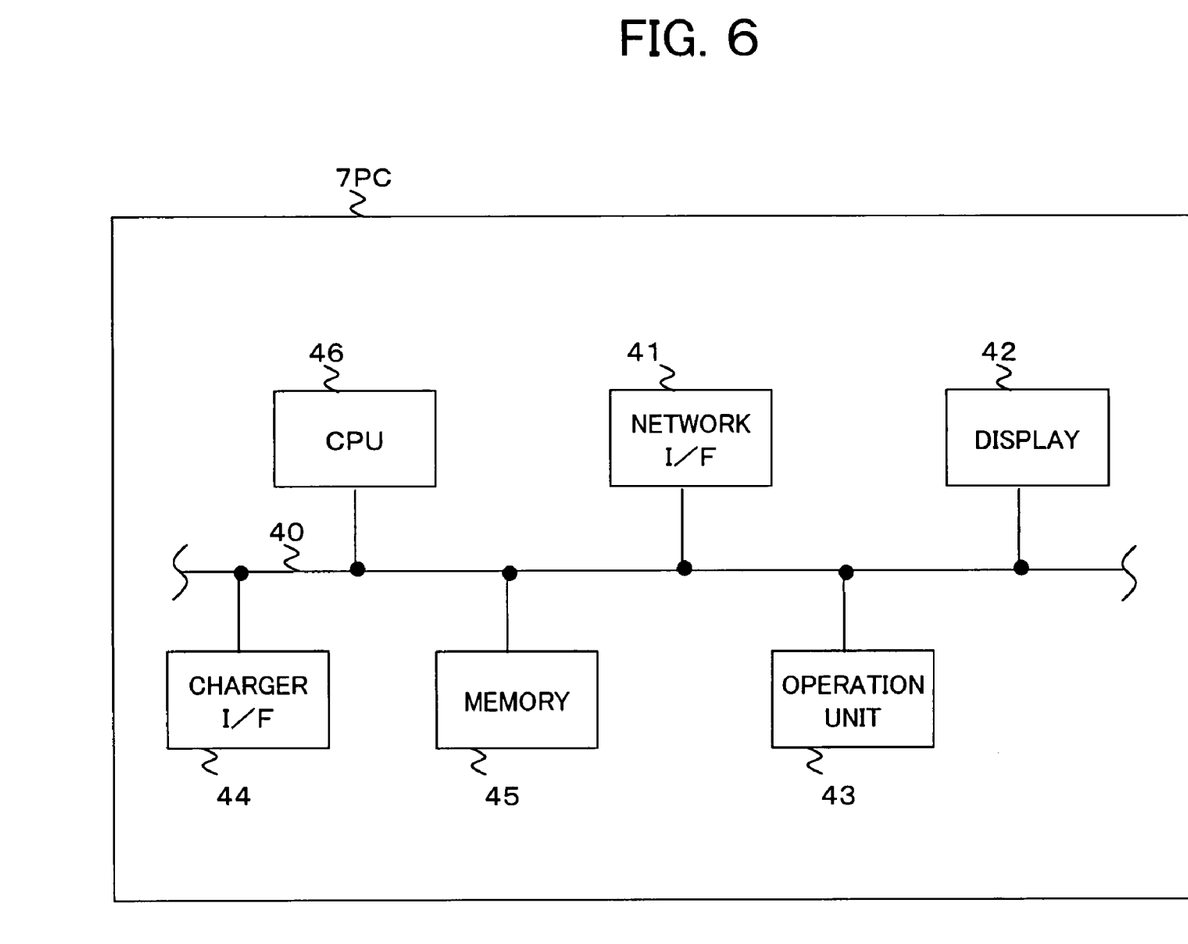
FIG. 6 is a view of the configuration of a personal computer shown in FIG. 1.

A content of a step ST21 in FIG. 4 and FIG. 6 corresponds to a first step of a first invention.

Contents of steps ST22 and ST23 shown in FIG. 6 correspond to a second step of the first invention.

A content of a step ST26 shown in FIG. 6 corresponds to a third step of the first invention.

Figure 2:
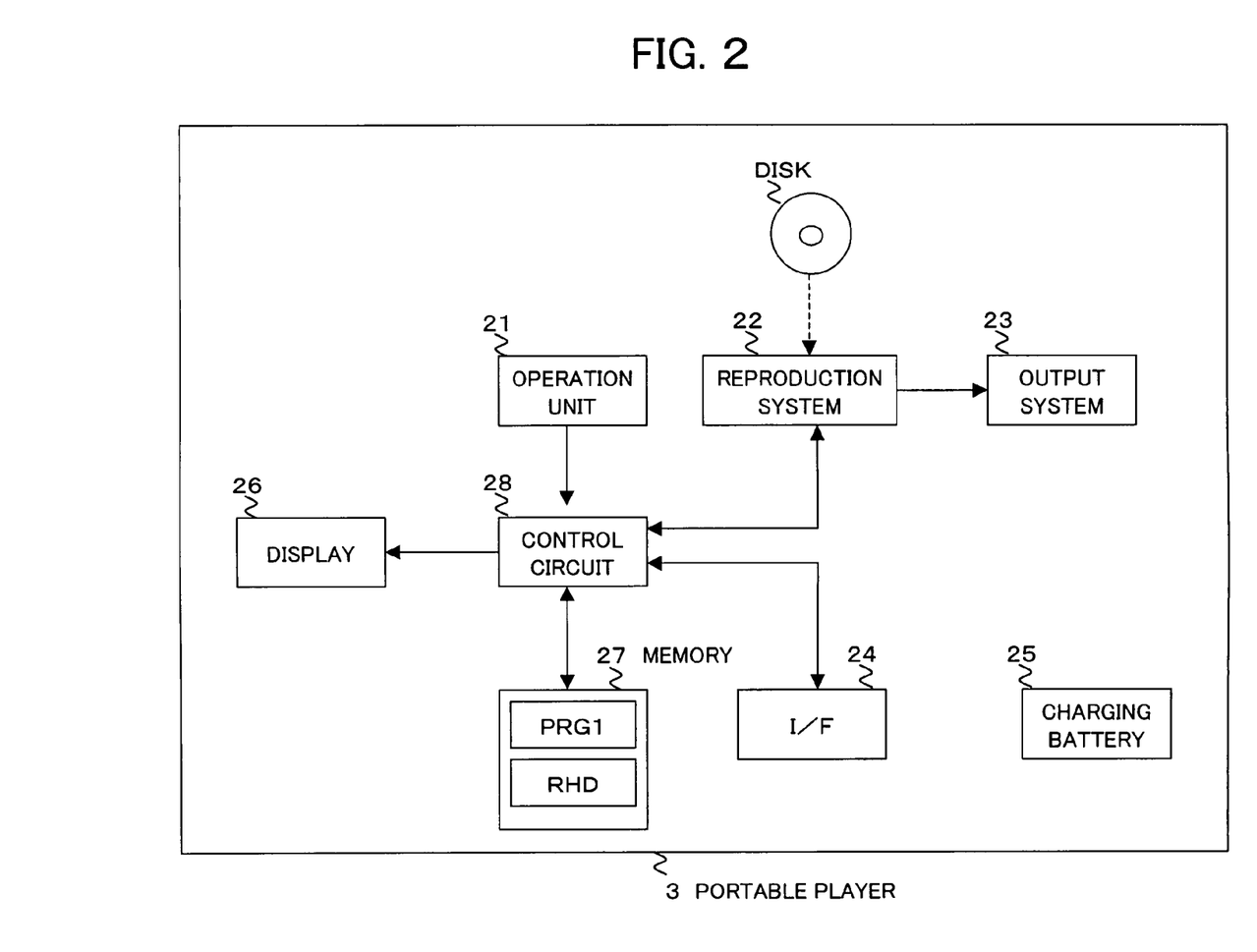
FIG. 2 is a view of the configuration of a portable player shown in FIG. 1.

Also, a reproduction system 22 shown in FIG. 2 corresponds to a reproduction means of a second invention, an operation unit 21 corresponds to an operation means, an interface 24 corresponds to an interface, a memory 27 corresponds to a memory, and a control circuit 28 corresponds to a control circuit.

Figure 7:
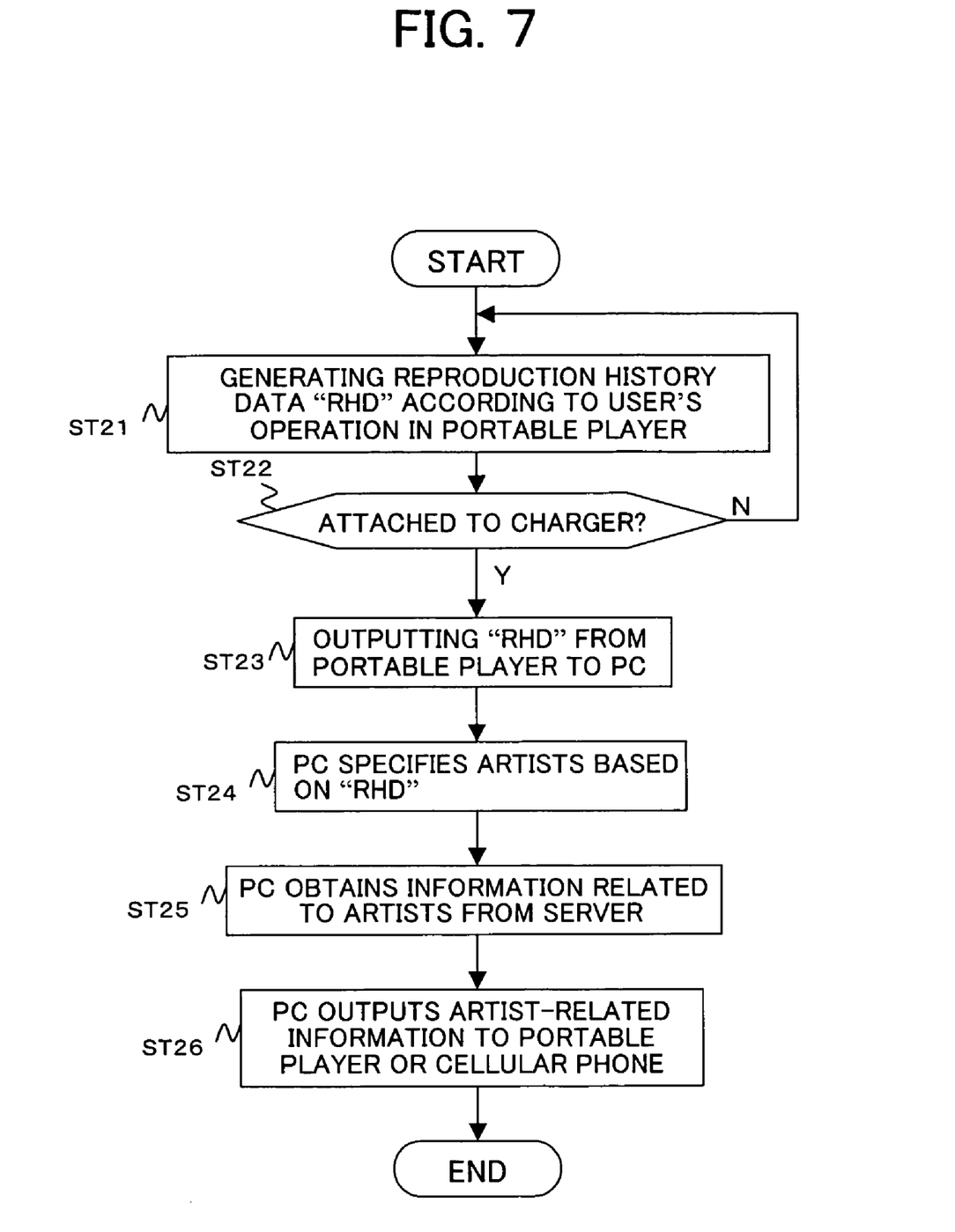
FIG. 7 is a flowchart for explaining an overall operation example of using reproduction history data of the audio processing system shown in FIG. 1.

Furthermore, a charger interface 44 shown in FIG. 7 corresponds to an interface of a third invention, and a CPU 46 corresponds to a control circuit.

FIG. 1 is an overall configuration view of the audio processing system 1 according to the first embodiment of the present invention.

As shown in FIG. 1, the audio processing system 1 includes, for example, a portable player 3, a charger 5, a personal computer 7, a server 9 and a cellular phone 11.

[Portable Player]

FIG. 2 is a view of the configuration of the portable player 3 shown in FIG. 1.

As shown in FIG. 2, the portable player 3 includes, for example, an operation unit 21, a reproduction system 22, an output system 23, an interface 24, a charging battery 25, a display 26, a memory 27 and a control circuit 28.

The operation unit 21 includes, for example, an operation button and outputs an operation signal in response to a user's operation to the control circuit 28. The operation unit 21 has operation buttons for carrying out reproduction operations of audio data, such as play, stop, skip and reverse skip.

The reproduction system 22 is, for example, loaded with a recording disk "DISK" attachably and detachably and outputs an audio signal reproduced from the recording disk "DISK" to the output system 23.

The reproduction system 22 is, for example, loaded with one recording disk "DISK" at a time. Note that a plurality of recording disks "DISK" may be loaded at a same time on the reproduction system 22.

The output system 23 includes, for example, a headphone for performing audio outputting in response to an audio signal received from the reproduction system 22.

The interface 24 inputs and outputs data to and from the personal computer 7 shown in FIG. 1 via the charger 5 in a state where the portable player 3 is attached to the charger 5 shown in FIG. 1.

The charging battery 25 supplies power to respective components of the audio processing system 1.

Also, the charging battery 25 is charged by the charger 5 in a state where the portable player 3 is attached to the charger 5 shown in FIG. 1.

The portable player 3 is attached to the charging battery 25, then, the portable player 3 and the personal computer 7 becomes to be in a connected state.

The display 26 displays a picture corresponding to an image signal input from the control circuit 28.

The memory 27 stores a program PRG1 for the control circuit 28 to execute and reproduction history data RHD to be used for processing in the control circuit 28, etc.

The memory 27 is a nonvolatile memory, such as an EEPROM.

Figure 3:
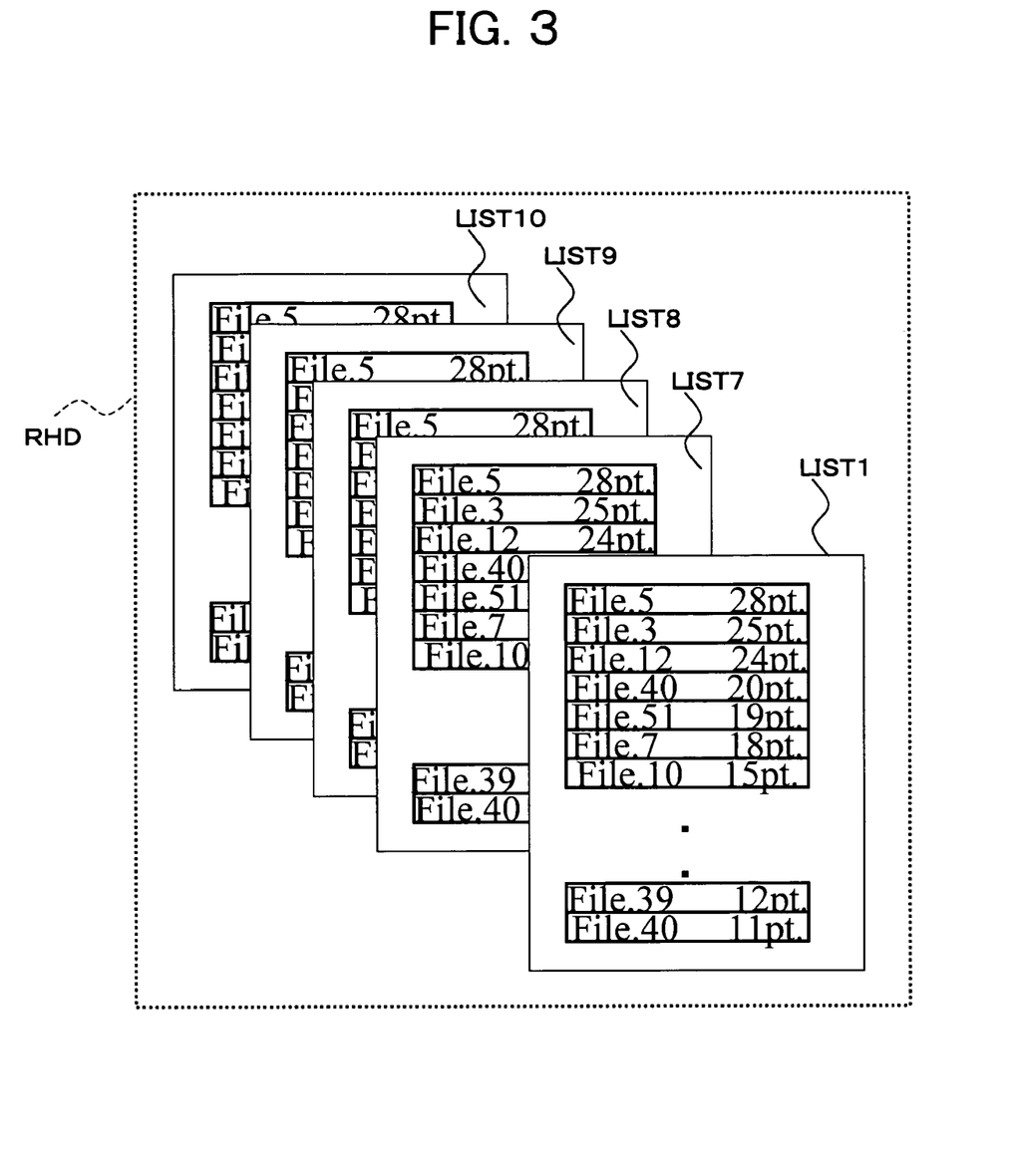
FIG. 3 is a view for explaining a reproduction history data in embodiments of the present invention.

FIG. 3 is a view for explaining reproduction history data RHD stored in the memory 27.

As shown in FIG. 3, the reproduction history data RFD includes, for example, ten list data LISTx at maximum.

Each of the list data LISTx is defined to be corresponding to identification data D_ID of the recording disk "DISK" loaded on the reproduction system 22.

The each list data LISTx indicates, when a recording disk "DISK" corresponding thereto is loaded on the reproduction system 22, reproduced times of each music data (audio data: "File" in FIG. 3) recorded on the recording disk "DISK".

In the present embodiment, by using the reproduction history data RHD shown in FIG. 3, it is sufficient if the control circuit 28 searches an item (an item, that increments the counter value) corresponding to reproduced music data (identification data of the music data) only in the list data LISTx specified at the time of loading the recording disk "DISK", so that the processing load is small.

The control circuit 28 executes the program PRG1 read from the memory 27 to control an overall operation of the portable player 3.

FIG. 4 is a flowchart for explaining processing of generating reproduction history data RHD in the audio processing system 1.

Step ST11:

The control circuit 28 judges whether or not the recording disk "DISK" is loaded on the reproduction system 22 and, when the recording disk "DISK" is loaded, the control circuit 28 carries out a content of a step ST12.

Step ST12:

The control circuit 28 reads identification data, D_ID from the recording disk "DISK" via the reproduction system 22.

Step ST13:

The control circuit 28 judges whether or not reproduction history data RHD stored in the memory 27 shown in FIG. 2 has the list data LISTx corresponding to the identification data D_ID read in the step ST12. When it has the procedure proceeds to a step ST14, otherwise, proceeds to a step ST15.

Step ST14:

The list data LISTx corresponding to the identification data D_ID in the step ST12 is updated in the reproduction history data by the control circuit 28.

After that, every time music data stored in the recording disk DISK is played in response to an operation from the operation unit 21, the control circuit 28 increments the reproduced times (pt) corresponding to the music data in the list data LISTx specified to be updated in the step ST14.

Figure 5:
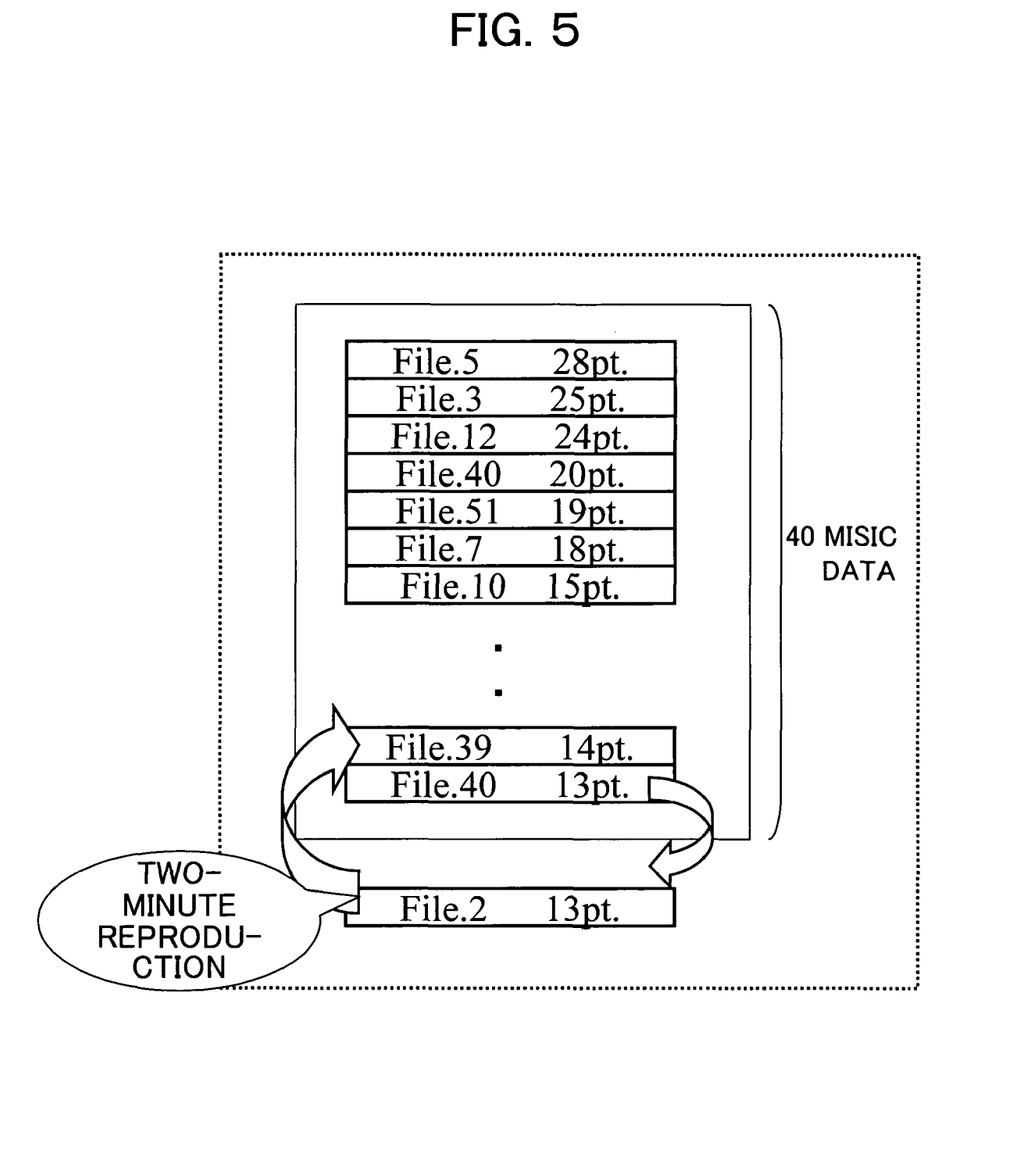
FIG. 5 is a view for explaining a reproduction history data in embodiments of the present invention.

Note that the list data LISTx indicates, for example as shown in FIG. 5, reproduced times of 40 music data in the recording disk "DISK" to be updated in the order of reproduced times from large. Therefore, when new music data is ranked in the top 40, reproduced times of music data with smallest reproduced times is deleted and that of the new music data is added.

Note that when a plurality of music data have the same reproduced times, the latest played music data comes to a higher rank.

Also, the condition that the control circuit 28 counts as a reproduced time is, for example, that half of one music data is played or one minute or longer of the music data is played after forwarding or rewinding.

Furthermore, other than the reproduced times of music data, the control circuit 28 may also manage loaded times of recording disks "DISK" by using their identification data D_ID and output the result to the personal computer 7. In that case, the personal computer 7 also refers to the loaded times of recording disks "DISK" to perform processing for specifying the user's preference (for example, favorite artists).

Step ST15:

When the reproduction history data RHD already has the maximum number of the list data LISTx, the control circuit 28 deletes the latest updated list data LISTx and adds the list data LISTx corresponding to the identification data D_ID read in the step ST12.

Step ST16:

The list data LISTx added in the step ST15 is updated in the reproduction history data by the control circuit 28.

[Personal Computer]

FIG. 6 is a view of the configuration of the personal computer 7 shown in FIG. 1.

As shown in FIG. 6, the personal computer 7 includes, for example, a network interface 41, a display 42, an operation unit 43, a charger interface 44, a memory 45 and a CPU 46, all connected by a data line 40.

The network interface 41 exchanges data with the server 9 via the network 8 shown in FIG. 1.

The charger interface 44 is connected to the charger 5 shown in FIG. 1 and, in a state that the portable player 3 is attached to the charger 5, inputs and outputs data to and from the portable player 3 via the charger 5.

The memory 45 stores a program for defining processing of the CPU 46, and data.

The CPU 46 receives from the server 9 service data RF according to preference of the user of the portable player 3 based on the reproduction history data RHD input from the portable player 3 via the charger interface 44 and outputs the same to the portable player 3.

[Overall Operation Example]

Below, an overall operation example of utilizing the reproduction history data RHD of the audio processing system 1 shown in FIG. 1 will be explained.

FIG. 7 is a flowchart for explaining an overall operation example of using reproduction history data of the audio processing system 1 shown in FIG. 1.

Step ST21:

The portable player 3 generates the reproduction history data RHD as explained with reference to FIG. 4.

Step ST22:

The portable player 3 and the personal computer 7 determines whether or not the portable player 3 is attached to the charger 5 and, when attached they proceed to the operation of a step ST23, but when not attached, they repeat the processing in the step ST 21.

Step ST23:

The reproduction history data RHD stored in the memory 27 of the portable player 3 is output from the interface 24 of the portable player 3 to the charger interface 44 of the personal computer 7 shown in FIG. 6.

The personal computer 7 writes the input reproduction history data to the memory 45.

Step ST24:

The CPU 46 of the personal computer 7 shown in FIG. 6 specifies favorite artists of the user of the portable player 3 based on the reproduction history data RHD input in the step ST23.

Specifically, the CPU 46 specifies an artist of music data with the largest reproduction times in the portable player 3.

Note that, in the present embodiment, although a case of specifying favorite artists as above in the CPU 46 will be explained, the control circuit 28 of the portable player 3 may specify user's favorite artists based on the reproduction history data RHD and output the result to the personal computer 7.

Step ST25:

The CPU 46 of the personal computer 7 shown in FIG. 6 makes an access to the server 9 from the network interface 41 via the network 8 shown in FIG. 1 and receives from the server 9 service data RD received in the step ST25.

Step ST26:

The CPU 46 of the personal computer 7 outputs from the charger interface 44 the service data RD received in the step ST25 to the portable player 3 via the charger 5.

Then, the portable player 3 displays the input service data RD on the display 26.

Note that, as shown in FIG. 1, the service data RD may be sent from the server 9 to the portable player 11 via the network 8, etc.

In the present embodiment, artist-related information indicated by the service data RD is, for example, comment information, concert information newly released music information and recommended music information, etc.

As explained above, according to the audio processing system 1, the reproduction history data RHD of the portable player 3 is output to the personal computer 7. Consequently, the personal computer 7 is capable of providing services correctly reflecting the user's preference based on the reproduction history of the portable player 3 of the user.

Also, according to the audio processing system 1, each list data LISTx composing reproduction history data RHD is defined to correspond to identification data D_ID of a recording disk "DISK" mounted on the reproduction system 22.

As a result, it is sufficient if the control circuit 28 of the portable player 3 searches an item (an item, that increments the counter value) corresponding to the reproduced music data (identification data of the music data) only in the list data LISTx specified at the time of loading the recording disk "DISK", so that the processing load is small (low).

Second Embodiment

The present embodiment has a feature on a personal computer 7A shown in FIG. 1, and other operations thereof are basically the same as those in the audio processing system 1 of the first embodiment.

FIRST EXAMPLE

Figure 8:
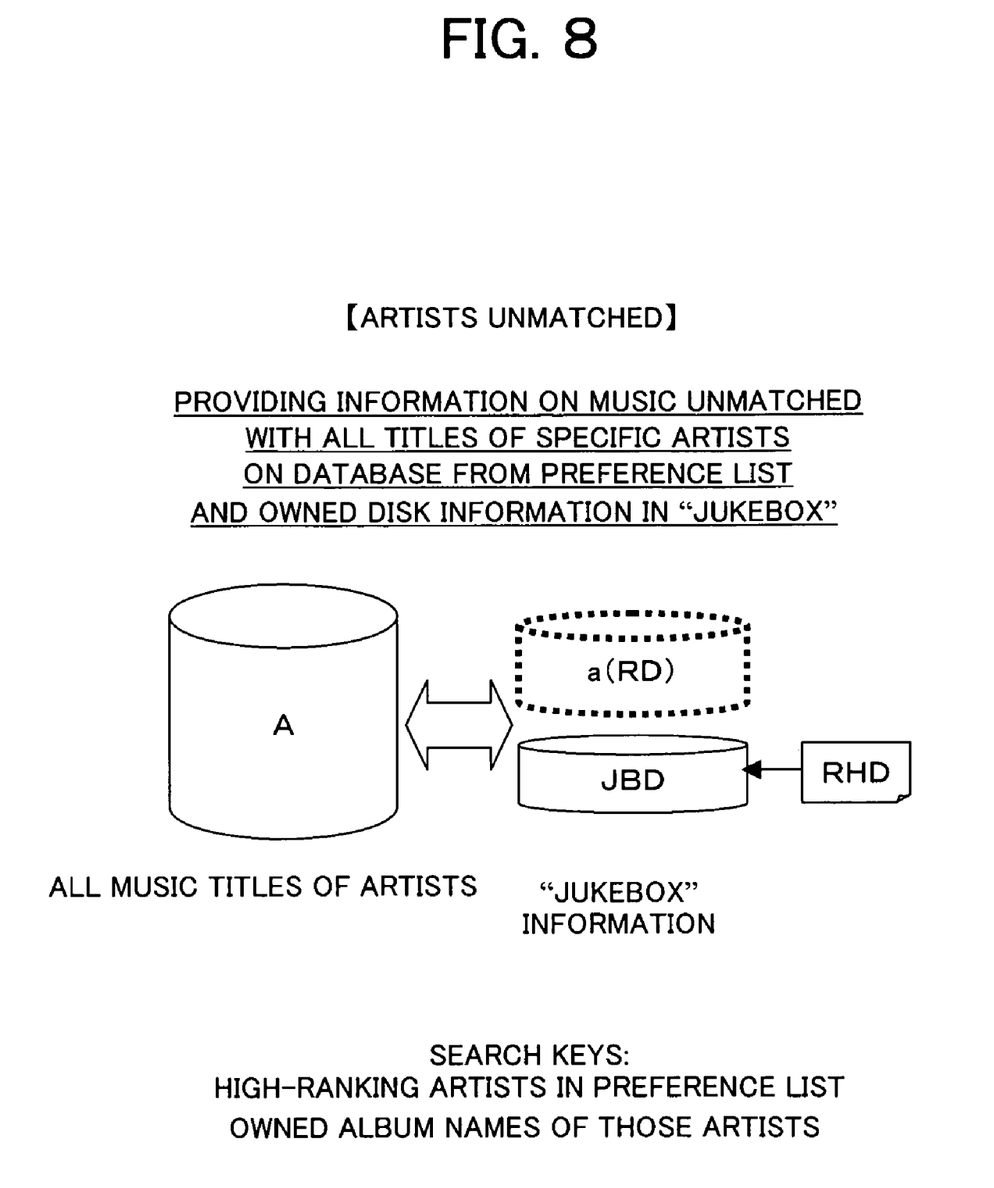
FIG. 8 is a view for explaining a first example of a second embodiment.

FIG. 8 is a view for explaining a first example of the second embodiment.

The CPU 46 of the personal computer 7A shown in FIG. 6 updates a jukebox data JDB indicating a list of recording disks owned by the user as shown in FIG. 8 based on reproduction history data RHD input from the portable player 3 as explained in the first embodiment.

The jukebox data JDB indicates a list of identification data of recording disks "DISK" reproduced by the personal computer 7A or portable player 3.

Next, the CPU 46 specifies a list of artists relating to the recording disks "DISK" in the order from large number of recording disks "DISK" based on the identification data of the recording disks "DISK" indicated in the jukebox data JDB.

Then, the CPU 46 sends a request data REQ indicating a predetermined number of artists with the larger number of disks to the server 9 via the network 41 shown in FIG. 6.

The server 9 sends the list data A indicating identification data of all recording disks "DISK" (albums) currently released by the artists indicated in the request data REQ.

The CPU 46 of the personal computer 7A compares the list data A with the jukebox data JBD and specifies in identification data in the list data A identification data not existing in the jukebox data JBD.

Then, the CPU 46 outputs as service data RD information "a," on recording disks "DISK" (albums) of the specified identification data to the portable player 3 via the charger interface 44 shown in FIG. 6.

The control circuit 28 of the portable player 3 displays the information "a" on the display 26 shown in FIG. 2.

As a result, the user can find out the albums yet to be owned by himself/herself among albums of own favorite artists.

Note that the CPU 46 of the personal computer 7A may send the above information to the cellular phone 11 of the user.

Also, when the user of the portable player 3 actually obtains the recording disk "DISK" based on the information "a", an administrator of the audio processing system 1 may gain margin for that.

SECOND EXAMPLE

Figure 9:
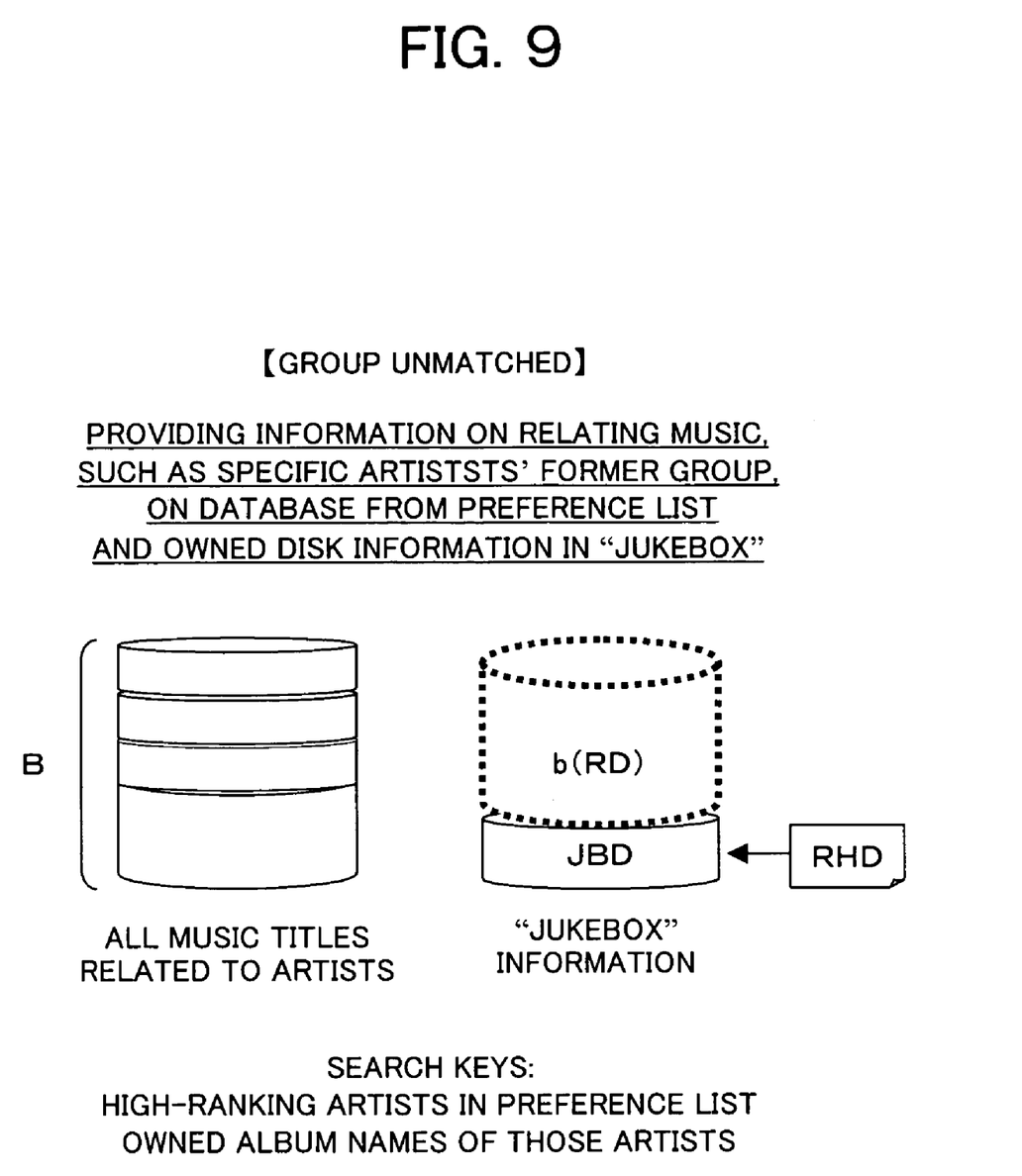
FIG. 9 is a view for explaining a second example of the second embodiment.

FIG. 9 is a view for explaining a second example of the second embodiment of the present invention.

The CPU 46 of the personal computer 7A shown in FIG. 6 updates a jukebox data JDB indicating a list of recording disks owned by the user as shown in FIG. 8 based on the reproduction history data RHD input from the portable player 3 as explained in the first embodiment.

Next, the CPU 46 specifies a list of artists relating to the recording disks "DISK" in the order from large number of recording disks "DISK" based on the identification data of the recording disks "DISK" indicated in the jukebox data JDB.

Then, the CPU 46 sends a request data REQ indicating a predetermined number of artists with the larger number of disks to the server 9 via the network 41 shown in FIG. 6.

The server 9 sends to the personal computer 7A a list data B indicating identification data of recording disks "DISK" (albums) relating to the artists included in the request data REQ.

For example, the server 9 sends to the personal computer 7A the list data B indicating all currently released recording disks "DISK" (albums) among a list of identification data of recording disks "DISK" of groups, to which the artists has belonged so far.

The CPU 46 of the personal computer 7A compares the list data B with the jukebox data JBD and specifies in identification data in the list data B identification data not existing in the jukebox data JBD.

Then, the CPU 46 outputs as service data RD information "b" on recording disks "DISK" (albums) of the specified identification data to the portable player 3 via the charger interface 44 shown in FIG. 6.

The control circuit 28 of the portable player 3 displays the information "b" on the display 26 shown in FIG. 2.

As a result, the user can find out the albums yet to be owned by himself/herself among albums of own favorite artists.

Note that the CPU 46 of the personal computer 7A may send the above information to the cellular phone 11 of the user.

THIRD EXAMPLE

Figure 10:
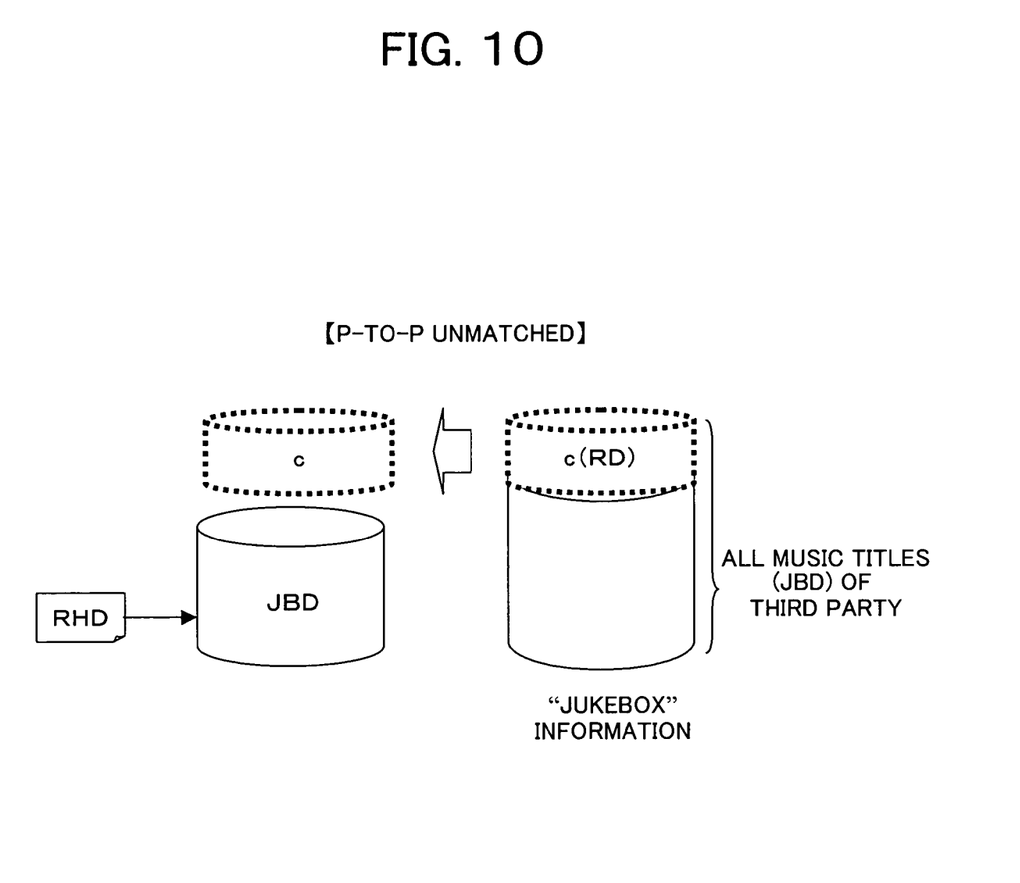
FIG. 10 is a view for explaining a third example of the second embodiment.

FIG. 10 is a view for explaining a third example of the second embodiment of the present invention.

The CPU 46 of the personal computer 7A shown in FIG. 6 updates the jukebox data JDB indicating a list of recording disks owned by the user as shown in FIG. 8 based on the reproduction history data RHD input from the portable player 3 as explained in the first embodiment.

Next, the CPU 46 sends the request data REQ including the jukebox data JBD to computers (not shown) of other users.

Then, among the other users' computers, a computer having the jukebox data JBD similar to that in the personal computer 7A (there are a predetermined or larger number of identification data of same recording disks "DISK") sends the own jukebox data JBD to the personal computer 7A.

The CPU 46 of the personal computer 7A compares the jukebox data received from the computer with that of its own and specifies an identification data not existing in the own jukebox data JBD from the identification data in the jukebox data received from other content data.

Then, the CPU 46 outputs as a service data RD information "c" on recording disks "DISK" (albums) of the specified identification data to the portable player 3 via the charger interface 44 shown in FIG. 6.

The control circuit 28 of the portable player 3 displays the information "c" on the display 26 shown in FIG. 2.

As a result, the user can find out the albums yet to be owned by himself/herself among albums of own favorite artists.

Note that the CPU 46 of the personal computer 7A may send the above information to the cellular phone 11 of the user.

FOURTH EXAMPLE

Figure 11:
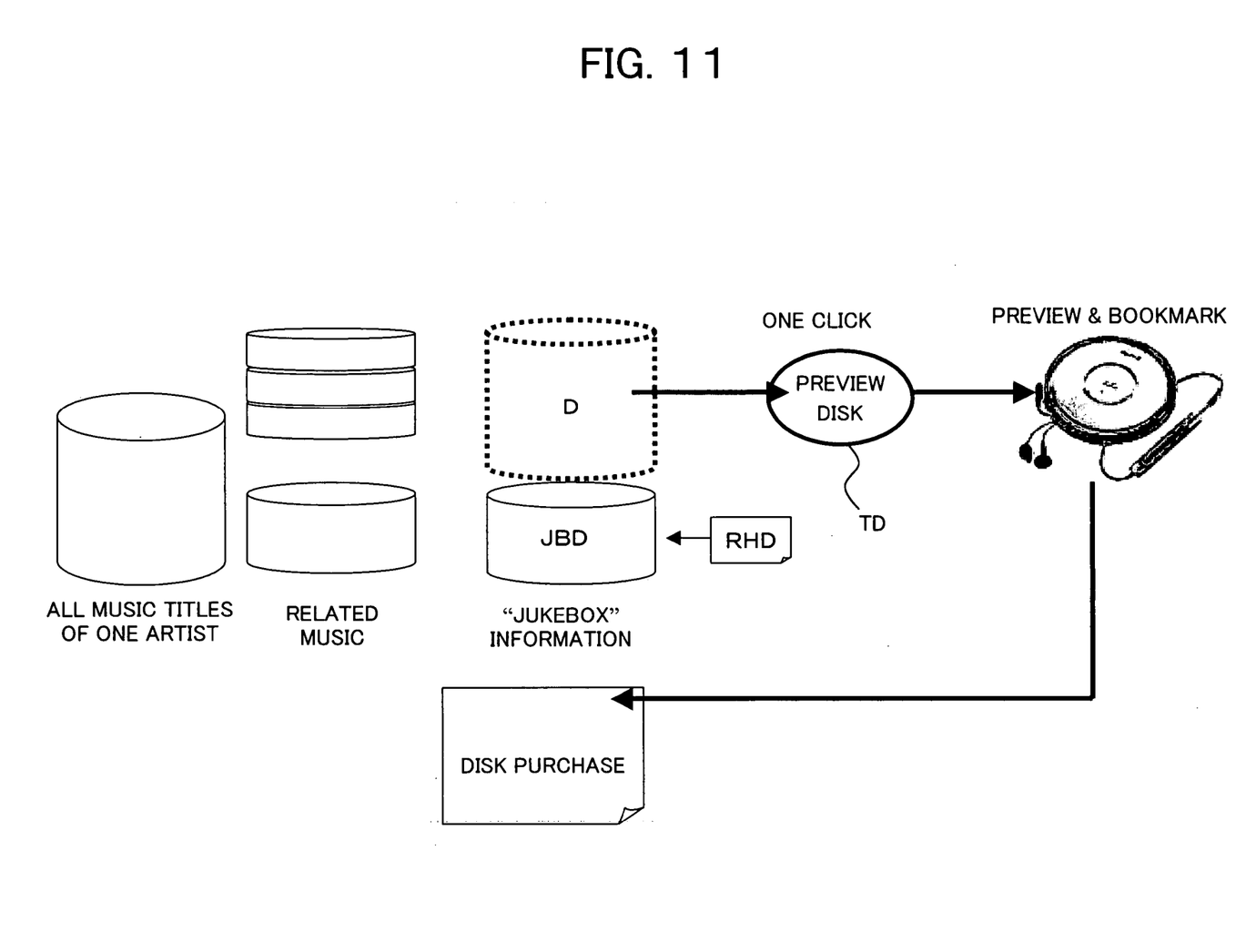
FIG. 11 is a view for explaining a fourth example of the second embodiment.

In the first, second and third examples explained above with reference to FIG. 8 to FIG. 10, the case of outputting information "a", "b" and "c" as the service data RD from the CPU 46 of the personal computer 7A to the portable player 3 were explained as examples, however, as shown in FIG. 11, the CPU 46 may generate a demo disk TD recorded with preview music data for recommending the music data to the user of the portable player 3 in response to one-click operations from the operation unit 21.

As a result, the user can reproduce the preview music data according to the user's preference by loading the demo disk TD on the reproduction system 22 of the portable player 3 shown in FIG. 2 to determine whether or not to purchase them.

For example, a control signal for allowing the preview music data to be played for a predetermined times (for example, three times) is recorded on the demo disk TD.

Also, by using a bookmark function provided to the portable payer 3, the user can put a bookmark on music data that he/she desires to purchase among the demo disk TD.

When the portable player 3 is attached to the charger 5, the CPU 46 of the personal computer 7A automatically reads the bookmark and displays the same on the display 26 to perform processing to assist the user to purchase the music data.

Also, the CPU 46 may output the preview music data to the portable player 3 instead of generating a demo disk TD.

As explained above, according to the second embodiment of the present invention, based on the reproduction history data RHD generated by the portable player 3, the service data according to preference of a user of a portable player 3 can be provided by cooperating the personal computer 7A and the server 9.

The present invention is not limited to the above embodiments.

In the above embodiments, the music data was taken as an example of content data of the present invention, but the content data of the present invention may be video data.

The present invention can be applied to a data processing system for providing services relating to content data.

It should be understood by those skilled in the art that various modifications, combinations, sub-combinations and alternations may occur depending on design requirements and other factors insofar as they are within the scope of the appended claims or the equivalents thereof.

What is claimed is:

1. A data processing method including:
reproducing content data through an output device by a reproduction apparatus;
storing a number of times the content data is reproduced by the reproduction apparatus as reproduction history data in a state where the reproduction apparatus is unconnected to an information processing apparatus;
outputting said reproduction history data stored in said reproduction apparatus from said reproduction apparatus to said information processing apparatus in a state where said reproduction apparatus is connected to said information processing apparatus; and
processing by said information processing apparatus for outputting data according to reproduction history of said reproduction apparatus to said reproduction apparatus based on said reproduction history data input from said reproduction apparatus in said outputting, said processing including determining a favorite artist based on the number of times each content has been reproduced in the reproduction history data, the favorite artist having a sum of reproduction times in the reproduction history data for all contents of the favorite artist greater than a sum of reproduction times for all contents of any other artist in the reproduction history data, said data outputted to said reproduction apparatus being information specific to the favorite artist.

2. The data processing method as set forth in claim 1, wherein, in said processing, said information processing apparatus outputs to said reproduction apparatus information on preference of a user of said reproduction apparatus based on said reproduction history data.

3. The data processing method as set forth in claim 1, wherein in said storing, said reproduction apparatus generates reproduction history data including identification data for identifying content data reproduced by the reproduction apparatus and an item indicating reproduction history of the content data; and in said processing, said information processing apparatus outputs data associated with an identification data matched with said identification data to said reproduction apparatus.

4. The data processing method as set forth in claim 1, wherein in said processing, said information processing apparatus performs processing for outputting to said reproduction apparatus information on content data assigned with an identification data other than said identification data indicated by said reproduction history data among content data corresponding to said identification data indicated by said reproduction history data.

5. The data processing method as set forth in claim 1, wherein in said processing, said information processing apparatus outputs to said reproduction apparatus content data assigned with identification data other than said identification data indicated by said reproduction history data.

6. The data processing method as set forth in claim 1, wherein in said storing, said reproduction apparatus generates the reproduction history data including the identification data for identifying content data reproduced by the reproduction apparatus and an item indicating reproduction history of the content data; and in said processing, said information processing apparatus performs processing for outputting to said reproduction apparatus information on content data of group artists, to which artists corresponding to said identification data indicated by said reproduction history data has belonged so far, as data according to the reproduction history.

7. The data processing method as set forth in claim 1, in said processing, said information processing apparatus receives from the information processing apparatus of other user reproduction history data of the user and performs processing for outputting data to said reproduction apparatus based on a comparison result of said own reproduction history data with the other user's reproduction history data.

8. The data processing method as set forth in claim 7, wherein in said storing, said reproduction apparatus generates the reproduction history data including the identification data for identifying the content data reproduced by the reproduction apparatus and an item indicating reproduction history of the content data; and in said processing, said information processing apparatus receives from other user's information processing apparatus having similar reproduction history data the user's reproduction history data, specifies identification data other than said identification data indicated by said reproduction history data received in said outputting among identification data of said content data indicated by the received reproduction history data, and performs processing for outputting information on content data of the specified identification data to said reproduction apparatus.

9. The data processing method as set forth in claim 1, wherein in said storing, said reproduction apparatus generates and stores said reproduction history data of a plurality of content data recorded on a removable recording medium loaded on the reproduction apparatus.

10. The data processing method as set forth in claim 9, wherein in said storing, said reproduction apparatus generates and stores said reproduction history data furthermore indicating loading history of said recording medium on said reproduction apparatus.

11. The data processing method as set forth in claim 1, wherein in said processing, said information processing apparatus performs processing for outputting to said reproduction apparatus data on content data appearing for a large number of times in reproduction history based on said reproduction history data input from said reproduction apparatus in said outputting.

12. A reproduction apparatus, comprising:
a reproduction unit configured to reproduce content data through an output device;
an interface configured to input and output data to and from an information processing apparatus, said interface configured to receive information specific to a favorite artist determined based on reproduction history data provided by the reproduction apparatus to the information processing apparatus, said information specific to the favorite artist including concert information for the favorite artist or most recently released music information for the favorite artist;
a control circuit configured to generate the reproduction history data indicating a number of times each content data is reproduced by said reproduction unit and to make said information processing apparatus output said reproduction history data when being connected to said information processing apparatus via said interface; and
a display configured to display the information specific to the favorite artist.

13. The reproduction apparatus as set forth in claim 12, wherein said control circuit generates the reproduction history data including an identification data for identifying the content data reproduced by the reproduction apparatus and an item indicating reproduction history of the content data.

14. The reproduction apparatus as set forth in claim 13, wherein said control circuit counts the number of reproduction times of said content data and generates the reproduction history data by using said reproduction number as an item indicating the reproduction history.

15. The reproduction apparatus as set forth in claim 12, wherein said reproduction apparatus further comprises an operation unit configured to instruct a reproducing operation of the content data by said reproduction unit; and said control circuit generates said reproduction history data in response to an instruction from said operation unit.

16. The reproduction apparatus as set forth in claim 12, wherein said reproduction apparatus further comprises a memory; and said control circuit generates the reproduction history data indicating the reproduction history of said content data by said reproduction apparatus, writes the same to said memory, reads said reproduction history data from said memory when the reproduction apparatus is connected to said information processing apparatus via said interface, and making said information processing apparatus output the reproduction history data.

17. The reproduction apparatus as set forth in claim 12, wherein said interface receives data in accordance with said reproduction history data from said information processing apparatus.

18. The reproduction apparatus as set forth in claim 17, wherein said control circuit generates said reproduction history data when said interface is in a state of being unconnected to said information processing apparatus, and receiving the data in accordance with said reproduction history data from said information processing apparatus when said interface is in a state of being connected to said information processing apparatus.

19. The reproduction apparatus as set forth in claim 12, wherein said reproduction unit is loaded with a recording medium in a removable way and reproduces said content data read from said loaded recording medium; and said control circuit generates said reproduction history data of a plurality of content data recorded on said recording medium loaded on said reproduction apparatus.

20. An information processing apparatus comprising:
an interface connected to a reproduction apparatus, configured to receive a reproduction history data indicating a number of times each content data is reproduced by the reproduction apparatus from the reproduction apparatus and to send information specific to a favorite artist to the reproduction apparatus; and
a control circuit configured to make said reproduction apparatus send data in accordance with said reproduction history via said interface, said control circuit configured to determine the favorite artist based on the number of times each content has been reproduced by the reproduction apparatus in the reproduction history data, the favorite artist having a sum of reproduction times in the reproduction history data for all contents of the favorite artist greater than a sum of reproduction times for all contents of any other artist in the reproduction history data.

21. The reproduction apparatus as set forth in claim 17, wherein said information specific to the favorite artist including concert information for the favorite artist or most recently released music information for the favorite artist.

22. The data processing method as set forth in claim 1, wherein the reproducing content data includes reproducing content data through an output device including a speaker by a reproduction apparatus.

23. The reproduction apparatus as set forth in claim 12, wherein reproduction unit is configured to reproduce content data through an output device including a speaker.

* * * * *